United States Patent [19]

Dale

[11] Patent Number: 5,659,151

[45] Date of Patent: Aug. 19, 1997

[54] WIRE MANAGEMENT KNOCKOUT CLOSURE FOR ELECTRICAL BOXES

[75] Inventor: James Lawrence Dale, Lawrenceville, Ga.

[73] Assignee: The Whitaker Corporation, Wilmington, Del.

[21] Appl. No.: 303,984

[22] Filed: Sep. 9, 1994

[51] Int. Cl.$^6$ ............... H02G 3/12; H02G 3/18
[52] U.S. Cl. ............... 174/48; 174/65 R; 52/220.8; 220/3.8; 220/212; 220/284; 254/134.3 FT; 248/73
[58] Field of Search ............... 174/48, 49, 65 R, 174/66, 67; 52/220.8, 28; 220/3.2, 3.3, 3.8, 284, 285, 212, 306; 254/134.3 FT; 439/535; 248/73, 56, 71

[56] References Cited

U.S. PATENT DOCUMENTS

| | | |
|---|---|---|
| 2,625,288 | 1/1953 | Clark et al. . |
| 2,686,065 | 8/1954 | Bergquist . |
| 3,941,915 | 3/1976 | Boghosian ............... 174/48 |
| 4,130,335 | 12/1978 | Kinney ............... 439/535 |
| 4,259,542 | 3/1981 | Tehan et al. ............... 174/48 |
| 4,264,779 | 4/1981 | Rhodes et al. ............... 174/48 |
| 4,295,018 | 10/1981 | Borrelli ............... 200/51.09 |
| 4,794,207 | 12/1988 | Norberg et al. ............... 174/48 |
| 5,167,047 | 12/1992 | Plumley ............... 16/2 |
| 5,445,539 | 8/1995 | Dale ............... 439/535 |

OTHER PUBLICATIONS

Modern Residential Wiring; Harvey Holzman; 1986 Goodheart—Wilcox Inc.; pp. 59–68.
GE Wiring Devices;Apr. 1989; 1–19.

Primary Examiner—Kristine L. Kincaid
Assistant Examiner—Dean A. Reichard

[57] ABSTRACT

A wire management knockout closure (92) associated with a knockout opening (86) in a wire receiving enclosure (84), includes a body section (94) adapted to traverse the knockout opening (86), a grippable portion (96) at an inwardly facing end, and a wire holding portion at an outwardly facing end (98) of the body section when the knockout closure (92) is disposed in the opening (86). The closure (92) further includes a retention section, which in cooperation with the knockout opening (86) removably retains the closure (92) in the knockout opening (86). When the closure (92) is in position, the wire holding portion extends exteriorly of the electrical enclosure (84) and is secured to the wire portions (76). When the closure (92) is pulled inwardly from the opening (86), portions of the wires (76) held thereby are likewise pulled into the enclosure for performance of worksteps thereon.

13 Claims, 5 Drawing Sheets

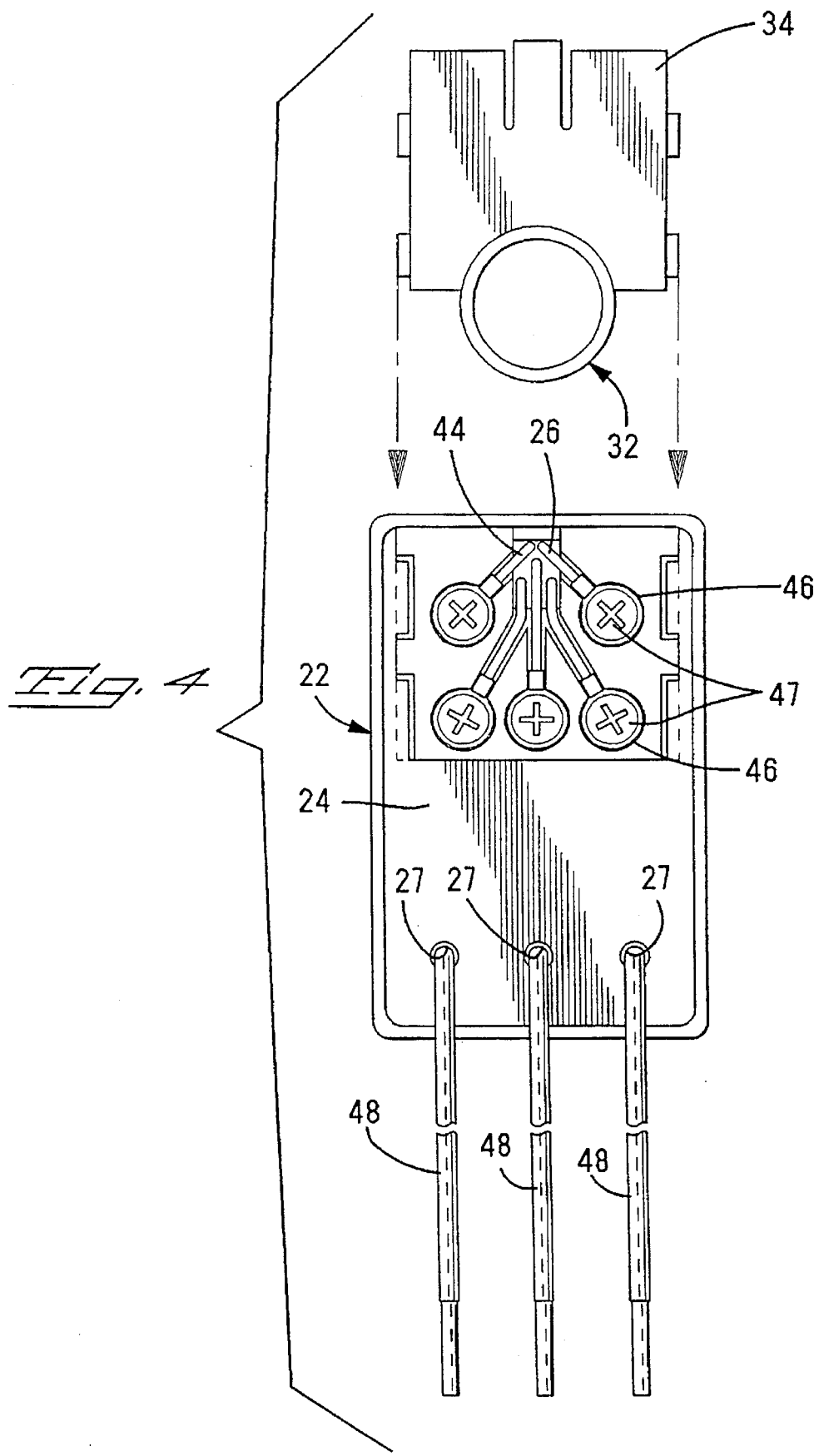

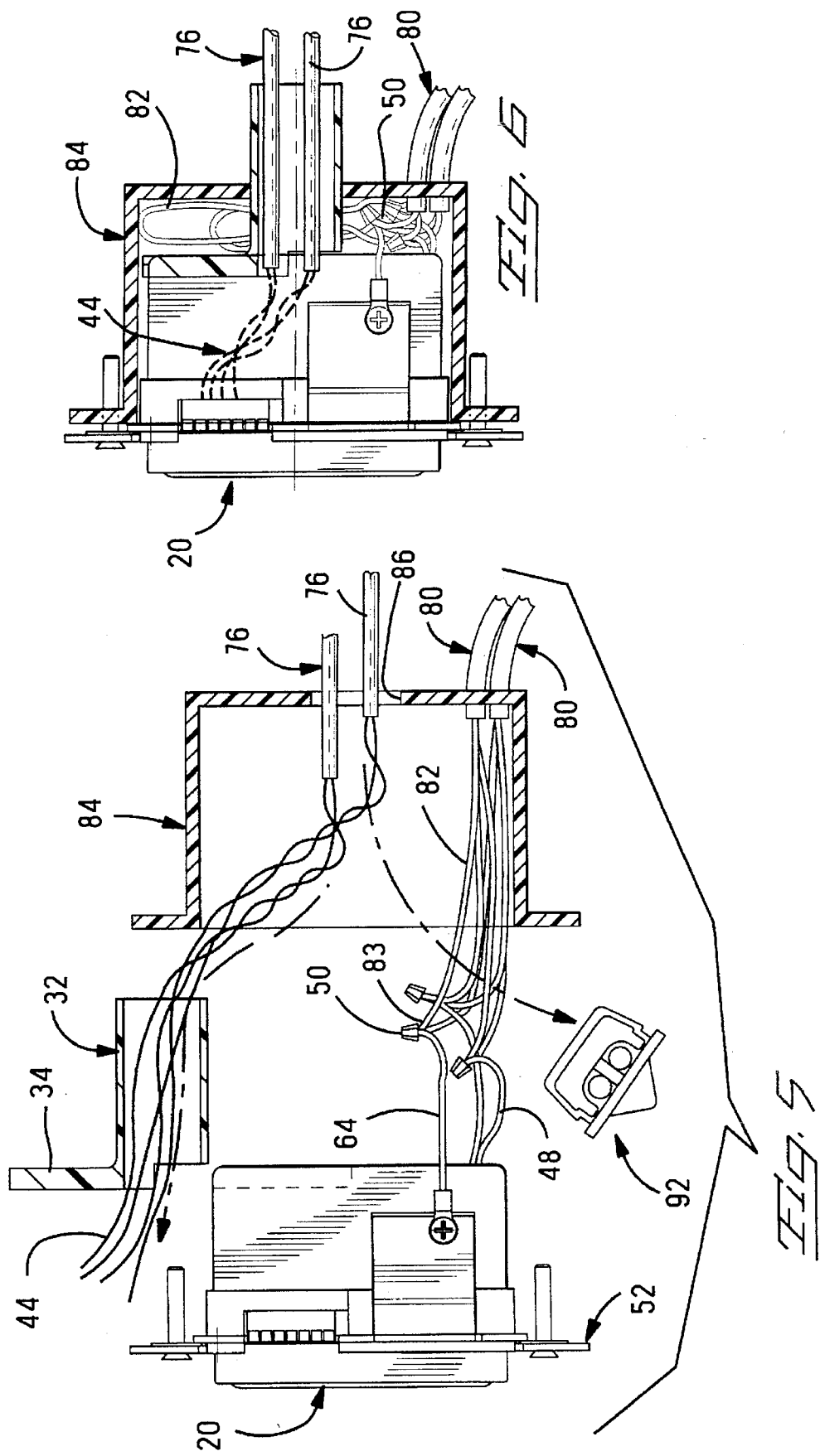

WIRE MANAGEMENT KNOCKOUT CLOSURE FOR ELECTRICAL BOXES

FIELD OF THE INVENTION

This invention is directed to an electrical wiring device used in prewiring a system during initial construction, to hold wires outside an electrical box until the wires are needed, the device also being used to pull the wires into the box when electrical connection is to be made.

BACKGROUND OF THE INVENTION

Home automation or management systems which permit increased control of at least some of the electrical subsystems in a dwelling have begun to replace or to supplement conventional wiring systems. These systems can provide automatic control of or can provide increased user control options for such systems as electrical power and lighting, heating ventilation and air conditioning, audio/video home entertainment systems, security systems, telecommunications equipment, and landscape maintenance systems such as automatic lawn sprinklers.

Many home control systems and lighting control systems or subsystems are generally incompatible with conventional wiring techniques. One common complaint is that the additional wiring required for such system results in a maze of additional wiring. The systems also tend to be relatively expensive. It is desirable, therefore, to have a wiring device that is compatible with existing wiring, and requires only the addition of easy to install low voltage wiring during initial construction. One such system is disclosed in U.S. patent application Ser. No. 08/313,985 in the name of Charles Winterble and filed concomitantly herewith.

In accordance with the National Electric Code (NEC), electrical conductors including electric light, power, class 1, or non power-limited fire protection signaling conductors must be separated from electrical conductors including power-limited class 2 or class 3 conductors. For purposes of this disclosure the power limited conductors will be collectively referred to as the first group of conductors and the class 1 and related conductors will be collectively referred to as the second group of conductors. The conductors of class 2 and class 3 or first group circuits cannot be in any cable, cable tray, compartment, enclosure, outlet box, raceway, or similar fitting with conductors from the second group conductors.

In accordance with the NEC conductors of the first group in cables, cable trays, enclosures, and raceways shall not be placed in any cable, cable tray, enclosure, or raceway or similar fitting with conductors of the second group. One exception to this is where the conductors of the different groups are separated by a barrier. Another exception is conductors and compartments or enclosures, outlet boxes or similar fittings where the first group of conductors are introduced solely to connect to the equipment connected to the first group of conductors.

The NEC further requires that all joints, connections and splices of electrical cables must be made inside an approved enclosure and further must include tight connections with the conduit or cable. Conventional electrical boxes may be made from metal or plastic. The box is further designed with great flexibility so that wires can be brought in from any side by removing a "knock out" to receive a lug for mounting fixtures or the like. In accordance with the present invention, the electrical box needs to include a knock out in the back of the box and additionally needs to be of sufficient depth to accommodate the wires of either a conventional device or a smart device.

While metal boxes are suitable for use with metallic or nonmetallic cable and conduit, nonmetallic boxes may only be used with nonmetallic cable and conduit. Plastic, polyvinyl chloride and fiber glass boxes are particularly popular as is the use of nonmetallic cable such as (NM, or NMC), commonly referred to as Romex cable. A grounding wire is also used with nonmetallic cable to provide proper grounding through the system. Nonmetallic boxes offer additional flexibility in that the material can be readily drilled to provide a cable receiving hole of the proper diameter at any desired location.

The present invention is designed to be compatible with the wires in a standard three way switch system having hot, neutral, switch hot and ground wires. In connecting the smart switch, the corresponding wires are interconnected with wire nuts. The remote control data wires are then connected to the stored remote control wires. It can be recognized from the standard three way wire system that having two power cables each with essentially four wires gets rather crowded when assembling the switch or device in the box. It is therefore necessary in accordance with NEC to have the barrier between the remote control data wires to have the required separation between the group 1 and group 2 wires. The three way wiring system allows a light or other devices to be switched on and off at more than one location. The same capability can be provided by using the smart wiring device which can be switched at the immediate location or from a remote control box via the data wire.

SUMMARY OF THE INVENTION

The present invention is directed to a wire management knockout closure associated with a knockout opening in a wire receiving enclosure. The closure includes a body section adapted to traverse a knockout opening, a grippable portion at an inwardly facing end of said body section and a wire holding portion at an outwardly facing end of said body section when said knockout closure is disposed in said opening. The closure further includes a retention section, which in cooperation with the knockout opening removably retains the closure in the knockout opening. Either or both of the retention section or body section is adapted to prevent the closure from passing through the opening. When the closure is in position, the wire holding portion is at least exposed exteriorly of the wire receiving enclosure and is secured to the wire portions. When the closure is pulled inwardly from the opening, the portions of the wires held thereby are likewise pulled into said enclosure for performance of worksteps thereon.

In the preferred embodiment, the retention section includes latch surfaces disposed on opposed beams extending from the outwardly facing end of the closure. Portions of the beams at the latch surfaces are laterally deflectable toward each other and into relief spaces during insertion of the closure into the knockout opening. The beam portions resile outwardly upon full seating of the closure in the opening to latch the closure to the wall of the wire receiving enclosure adjacent the knockout opening. The ends of the beams are joined to a common transverse bight section supporting the beam ends to assure resiling radially outwardly to a latched condition upon full seating of the closure in the opening and supporting the latched condition thereafter.

For purposes of illustrating the invention, the wire management knockout closure is shown being used representatively in conjunction with a wiring device disclosed in U.S. patent application Ser. No. 303,911 now U.S. Pat. No.

5,445,539 in the name of James L. Dale and filed concomitantly herewith. The wiring device of Ser. No. 303,911, now U.S. Pat. No. 5,445,539 includes a first electrical connection element for interconnection to conductors in a first group, a second electrical connection element for interconnection to conductors in a second group. The first group of conductors includes power limited Class 2 or Class 3 conductors. The second group of conductors includes electric light, power, Class 1, or nonpower-limited fire protection signaling conductors. The wiring device is used with an electrical box having an opening extending through the rear face of the electrical device box such that the conductors in the first group can be fed from the electrical box and through a tubular projection of the device and interconnected to corresponding conductors thereof. The tubular projection extends over the first electrical connection element and acts as a barrier between the conductors of the first group and the conductors of the second group.

It is to be understood that the wire management knockout closure may be used in many other arrangements as welt. The closure is particularly useful in any system wherein wires to be used at a future date may be installed during initial construction, safely retained in a desired location without interfering with whatever electrical article is originally installed in a box, and be readily retrievable when the wires are to be utilized with a different electrical device.

It is an object of the present invention to provide a wire management knockout closure adapted to be mounted in standard knockout openings of electrical device boxes, the closure having capability of holding wires outside the box until such time that the wires are to be connected to an electrical article.

It is a further object of the present invention to provide a knockout closure that permits prewiring of a building for future use of the wires in later upgrading of the system or the like.

It is a further object of the present invention to provide a knockout closure that can be inexpensively manufactured, preferably as a one piece molded member.

Furthermore it is of course necessary that this device be compatible with applicable codes, including most particularly the National Electric Code.

Embodiments of the present invention will now be described by way of example with reference to the accompanying drawings.

BRIEF DESCRIPTION OF THE DRAWINGS

FIG. 4 is a rear view of a representative wiring device to be installed in an upgraded system.

FIGS. 5 and 6 illustrate the means for upgrading a standard device box for the wiring device of FIG. 4. FIG. 5 illustrates the signal wires pulled into the box and through the tubular projection of the device of FIG. 4 for interconnection to signal and power in the device. FIG. 6 illustrates the wiring device inserted into the wall box with the power and signal wires interconnected, the tubular projection providing the requisite barrier between the power conductors and low voltage conductors.

DETAILED DESCRIPTION OF THE EMBODIMENT

Figure 1:
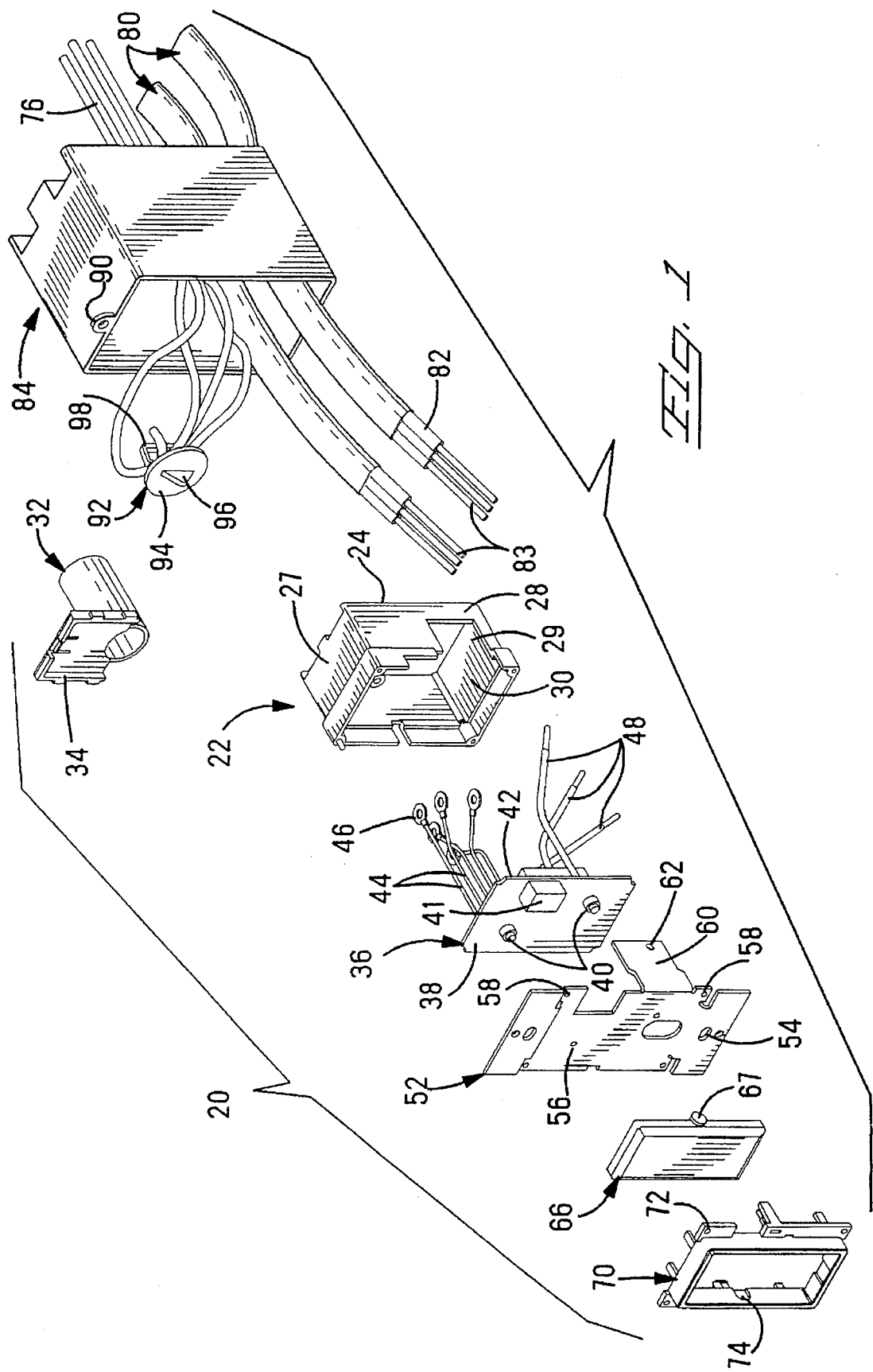
FIG. 1 is an exploded perspective view of the wiring device of the present invention prior to installation in a conventional wall box.

For purposes of illustrating the invention the closure is shown being utilized in a prewiring system that is being upgraded with a wiring device 20, as shown in FIGS. 1, 4, 5 and 6. Wiring device 20 is mountable in a conventional electrical device box 84 secured in a wall (not shown). The electrical wiring device includes first and second connection elements 46,50 for interconnecting two groups of conductors to respective conductors of another electrical device. The first group includes power limited Class 2 or Class 3 conductors 76 and the second group includes electric light, power, Class 1, or nonpower-limited fire protection signaling conductors 82. The wiring device 20 is activated by signals transmitted over the low voltage wires 76 from a remote device. For purposes of illustrating the invention the wiring device 20 is shown as a rocker operated switch used for example to control lights.

Figure 2:
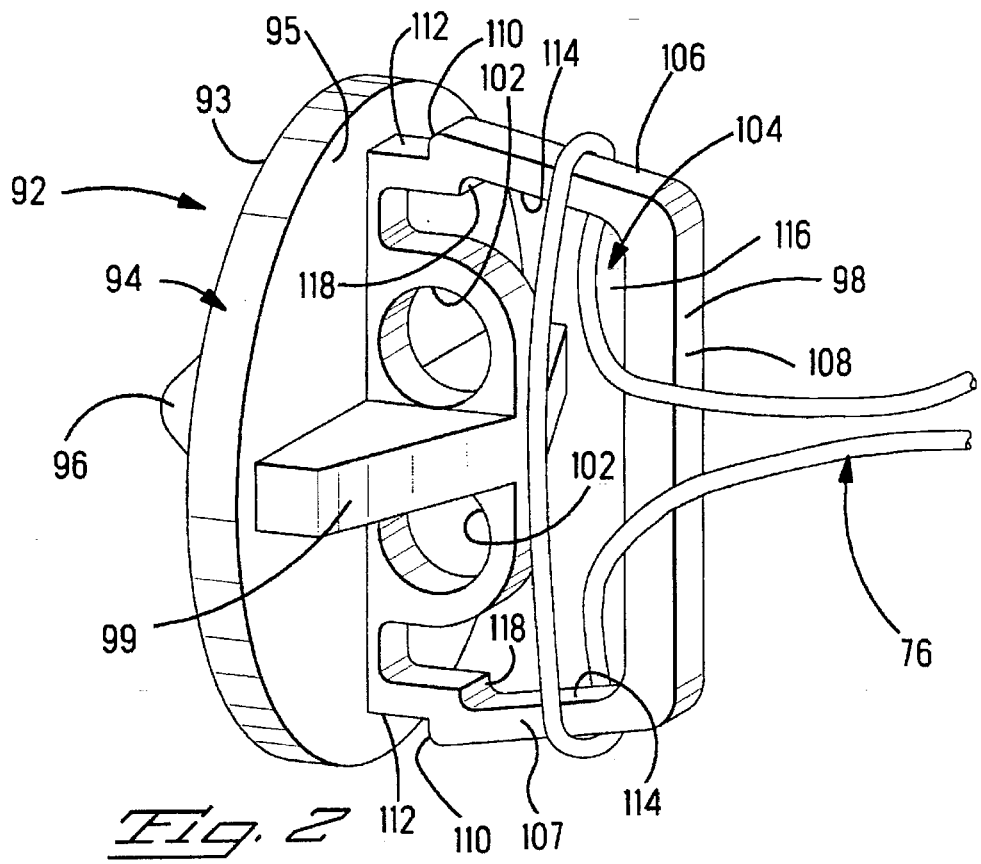
FIG. 2 is a perspective view of the signal wire holding wire management knockout closure used to prewire a conventional box.
Figure 3:
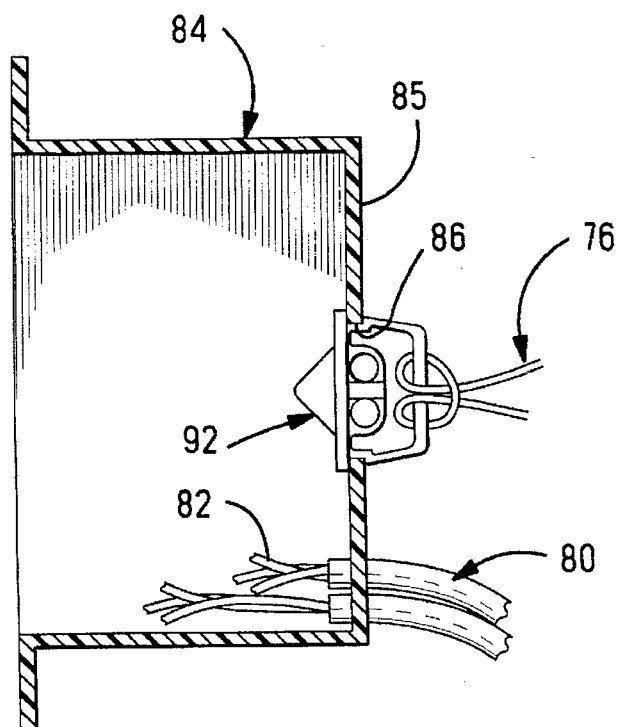
FIG. 3 is a cross-sectional view of a conventional wiring box mounted in a wall and having the signal wires prewired and secured in a wire management knockout closure extending from the rear of the box.
Figure 7:
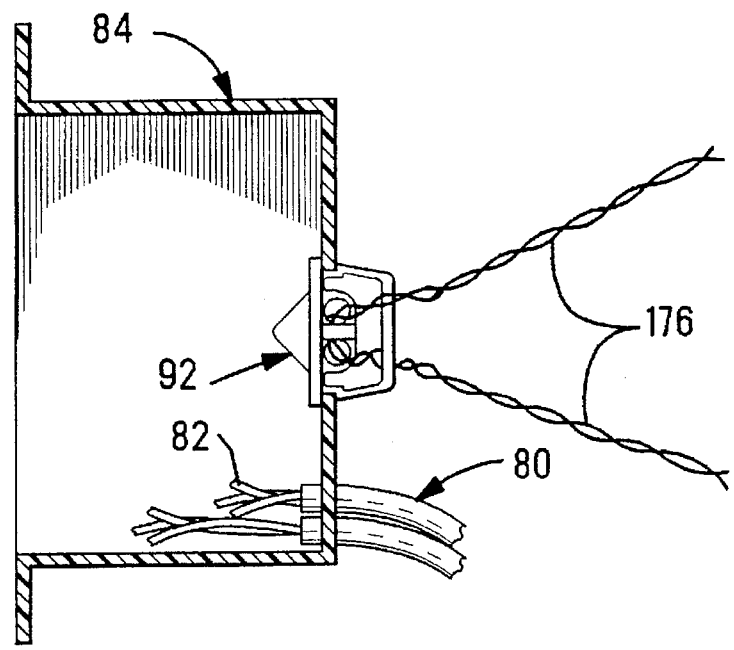
FIG. 7 shows an alternative embodiment of the signal wires being held at the rear of a convention wire box in a wall.

FIG. 2 shows one embodiment of a wire management knockout closure 92 made in accordance with the invention. As shown in FIG. 3, closure 92 is used to secure the low voltage or class 2 or class 3 wires in a knockout opening 86 at the rear of the conventional wire enclosure box 84 box in a pre-wire configuration.

In a prewire configuration, conventional wiring devices, such as general use snap switches, are installed in electrical device boxes. Low voltage wiring is run to the electrical device boxes during the prewire stage to permit subsequent upgrading. This upgrading is accomplished by installing a smart wiring device which can be remotely controlled by signals transmitted on these low voltage wires. The wire management knockout closure can be mounted in a circular knockout of an electrical device box to secure the low voltage wire to the electrical device box during the prewire stage when conventional wiring devices are in use. The National Electric Code requires that the low voltage wiring be separated from the line voltage wiring. This separation is maintained since the wire management knockout closure secures the low voltage wire on the exterior of the box.

The wire management knockout closure 92 includes a body 94 having opposed major surfaces 93, 95. Major surface 93 includes a grippable portion 96 extending outwardly therefrom. Portion 96 is grippable by a tool, such as pliers or the like, or by fingers (not shown) thereby enabling the wire management knockout closure 92 and the wires 76 secured thereto to be pulled into the interior of the box 84. The loops of wires 76 can then be cut, releasing knockout closure 92 and enabling electrical connection of the wires 76 to a wiring device such as device 20.

Body portion 94 is dimensioned to be slightly larger than the dimension of the knockout opening 86 to prevent closure 92 from passing through opening 86. The opposite or rearwardly facing surface 95 of the body 94 includes outwardly extending portion including walls, 99 98 having apertures 102 and slot 104 therein for receiving individual wires 76 or cables or the like of the prewired system. The outwardly facing portion 98 further defines a retention section having latch surfaces 110 disposed on opposed beams 106, 107 extending from the outwardly facing end of the closure 92. Portions of the beams 106 at the latch surfaces 110 are laterally deflectable toward each other and into relief spaces 116 during insertion of the closure 92 into the knockout opening 86. The beam portions resile outwardly upon full seating of the closure 92 in the opening 86 to latch the closure 92 to the wall of the wire receiving enclosure 84 adjacent the knockout opening 86 and support the latched condition thereafter.

In the preferred embodiment the outer corner of the latch surfaces 110 are rounded tending to facilitate passing of the retention portion through the knockout opening 86 and minimizing the possibility of the retention surface snagging the enclosure upon attempted removal of the closure from the opening. The latching surfaces 110 define radially inwardly directed recesses 112 in the retention section. As can be seen from FIGS. 2 and 3, the bottom surfaces of the recesses 112 are spaced from each other by a dimension that is just less than the width of the opening 86 in the box 84 and the axially extending dimension of the recesses 112 are greater than the thickness of the box wall through which the closure 92 passes. The inwardly facing surfaces 114 of the beam portions adjacent respective the recesses 112 include notches 118 that facilitate inward deflection of the beam portions during insertion of the closure 92 into, and removal thereof from, the opening 86. To retain the "unused" wires 76 outside the enclosure 84, the wire holding portion of the closure 92 is at least exposed exteriorly of the enclosure 84 and in the preferred embodiment, the wire holding portion extends outwardly of the wall of the enclosure 84 when the closure 92 is in position in the knockout opening 86.

The openings 102 have an inside diameter substantially equal to the outer diameter of the wire to be used. Ends of the wires can be threaded through openings 102 where they will be gripped so that the wires can be withdrawn when the closure 92 is pulled into the interior of the wall box 84. The opening 104 is substantially larger. A continuous wire can be looped through this opening and around the closure and around the outside of the upper and lower beams 106 and 107 defining the upper and lower boundaries of slot 104. The wire can then be wrapped around the laterally extending arm of the wall 98 defining the outer lateral side of slot 104. The wire is thus secured to the closure and the wire does not have to be cut for attachment. With this configuration both wire ends and a continuous loop can be secured by this closure. FIGS. 2 and 3 illustrate two ways of securing a continuous loop of cable to closure 92.

A transversely extending truncated wall 99 extends outwardly from the body 94. This wall 99 extends between the openings 102 and the width of this wall is approximately equal to the diameter of the wall box knockout hole in which the closure is to be inserted. Wall 98 and wall 99 thus position the closure in the circular knockout.

The gripping portion 96 of the closure is parallel to the wall 98 containing the holes 102 and the slot 104. Indeed in the preferred embodiment of this invention, the gripping portion 96 is in the same plane as the wall 98. Transversely extending wall 99 has no holes or undercuts. This configuration can be molded using a relatively inexpensive mold which does not have any side pulls. The parting line for this mold would be parallel to the plane of the wall 98 through which molded openings must be formed.

The wiring device 20 as shown in FIG. 1 includes a housing 22 having a tubular projection 32 mountable to the housing 22 to extend through a knockout opening 86 in an electrical device box 84, as shown in FIGS. 5 and 6. The rocker operated switch has a circuit board 36 with means for connection to low voltage and power connectors 76,82, a mounting strap 52 for mounting the wiring device 20 in an electrical device box 84, a rocker actuator 66 and a bezel 70. Housing 22 has a rear wall 24, opposed side walls 28, and end walls 27, together defining a component receiving cavity 30.

The circuit board 36 includes opposed major surfaces 38,42. The first major surface includes standard momentary printed circuit board switches 40 or key switches and further electrical components 41. Extending rearwardly from the second major surface 42 are a plurality of signal conductors 44, and leads 48 for interconnection to power conductors 82 in cables 80 which extend into the wall mounted box 84. In assembling the device 20 as shown in FIGS. 5 and 6, the first group or signal conductors 44 are passed through an opening 26 in the rear wall 24 of housing 22 and connected to terminals 46 with screws 47 as shown in FIG. 4, or with other conventional means as known in the art. The power conductors 48 extend through the respective openings 27 at the bottom of the rear housing wall 24 and are separated from the power limited conductors 44, as required by the NEC. Tubular projection 32 is mountable to the rear wall 24 of the housing 22 such that projection 32 is in communication with first electrical connection elements 46. The tubular projection 32 and plate 34 are then secured to the back of the box shown as a sliding motion in FIG. 4. The details of the wiring device are more fully described in patent application Ser. No. 303,911, now U.S. Pat. No. 5,445,539.

As signal conductors 76 are fed through the tubular projection 32 from the rear of box 84 and interconnected by conventional means to first connection elements 46, the tubular projection 32 is then mounted into position on rear housing wall 24 thereby providing a barrier between the first or power limited conductors and the power conductors 82.

Mounting strap 52 includes apertures 54 for securing the strap 52 to the box 84, a plurality of apertures 56 corresponding to the key switches 40 on the circuit board 36 and a plurality of apertures 58 for securing the component assembly 20 together as shown in FIG. 5. The rocker actuator 66 includes rocker pivot portion 67 extending from the sides thereof and piston actuators on the rear of the rocker (not shown) that engage the key switches 40 of the circuit board 36 when the rocker actuator 66 is activated. The bezel 70 includes slot 74 for receiving the pivot portion 67 of the rocker actuator and apertures 72 for securing the components in housing 22.

FIG. 3 illustrates the conventional wire box 84 mounted in the wall having power conductors 80 entering the conventional box 84, the conventional device disconnected from the conductors 82 in preparation for upgrading with a smart device. In accordance with the present invention a wire management knockout closure 92 extends through the rear wall of the box 84 and has signal wires 76 attached thereto and secured for later upgrading to the wiring device of the present invention. FIGS. 5 and 6 illustrate the upgrading a wiring system wherein the wire management knockout closure 92 is pulled into the box 84 thereby pulling the low voltage cable 76 inside for feeding through the tubular projection 32 of wiring device 20 and for interconnection to respective connecting portions 46 at the rear of the box or housing 22 as previously described and illustrated in FIG. 4. The power conductors 82, which are present in the box when the standard device was mounted, are secured to the respective power leads as shown in FIG. 5. A ground wire 64 is secured to the side of the mounting strap 52 and connected to the corresponding ground wires of the two cables 80 with the second connection element, shown as wire nut 50, the respective neutral wires are connected with another wire nut 50 and the respective hot wires and switched hot wire are connected with other wire nuts 50.

The assembled and wired device 20 is inserted into the box such that the projection 32 extends through the knockout opening 86 in the rear wall 85 of box 84 that previously held knockout closure 92.

Figure 8:
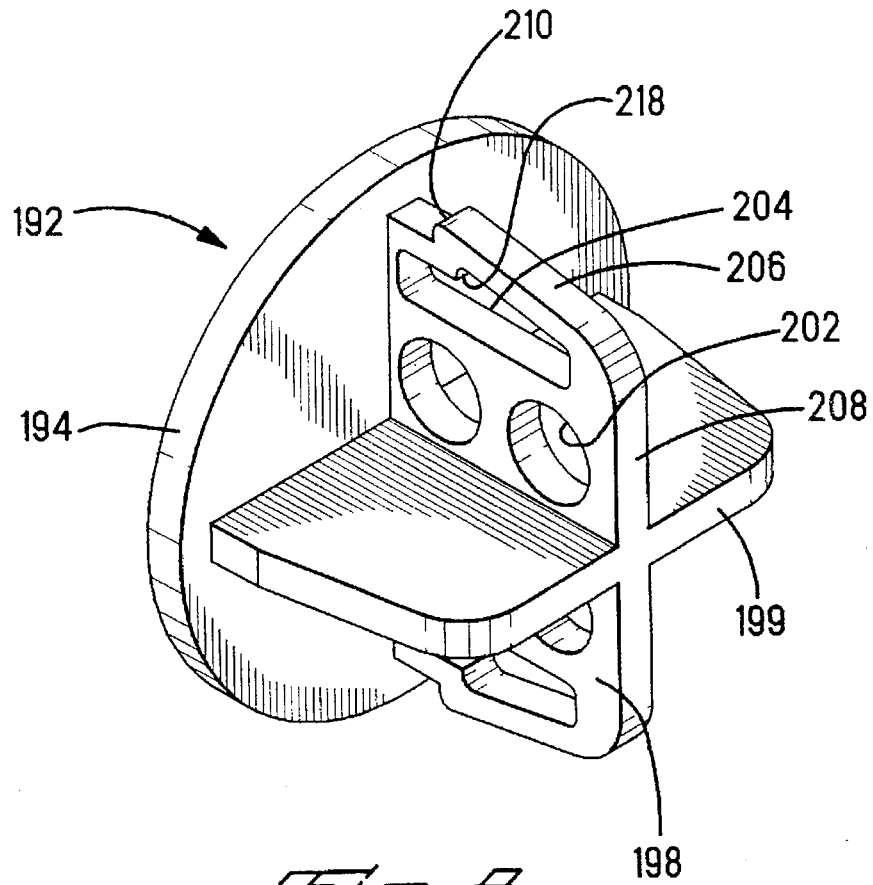
FIG. 8 illustrates an alternative embodiment of the wire management knockout closure for holding the signal wires at the rear of a conventional housing in a prewiring system.

FIG. 8 shows an alternative embodiment 192 of a wire management knockout closure for holding wires in the prewired condition. The rearward face of body 194 includes walls 198 having an arrangement of apertures 202 and slots 204 through which wires may be looped. Embodiment 192 includes beams 206 joined with bight section 208, latch surfaces 210 and inwardly directed notches 218 all of which function in the manner previously described.

As can be seen from the foregoing description the present invention provides a means whereby a house or other building can be prewired and then upgraded at a later time to provide greater capability wherein the low voltage and power wires remain isolated from one another.

It is thought that the wire management knockout closure of the present invention and many of its attendant advantages will be understood from the foregoing description. It is apparent that various changes may be made in the form, construction, and arrangement of parts thereof without departing from the spirit or scope of the invention, or sacrificing all of its material advantages.

I claim:

1. A wire management knockout closure associated with a knockout opening in a wall of a wire receiving enclosure, said closure comprising:

a body section adapted to traverse said opening;

a grippable portion at an inwardly facing end of said body section when said closure is disposed in said opening; and a wire holding portion at an outwardly facing end of said body section when said closure is disposed in said opening:

said closure further including a retention section, which in cooperation with said opening removably retains said closure in said opening;

one of said retention section and said body section being adapted to prevent said closure from passing through said opening, whereby when said closure is in position, said wire holding portion is at least exposed exteriorly of said enclosure and is secured to portions of wires, and when said closure is pulled inwardly from said opening, said portions of wires are pulled into said enclosure for performance of worksteps thereon, and wherein;

said retention section includes latch surfaces disposed on opposed beams extending from said outwardly facing end of said closure, portions of said beams at said latch surfaces being laterally deflectable toward each other and into relief spaces during insertion of said closure into said knockout opening, and said beam portions resting outwardly upon full seating of said closure in said opening to latch said closure to said wall of said wire receiving enclosure adjacent said opening.

2. The wire management knockout closure of claim 1 wherein ends of said beams are joined to a common transverse bight section supporting said beam ends to assure resiling radially outwardly to a latched condition upon full seating of said closure in said opening and supporting said latched condition thereafter.

3. The wire management knockout closure of claim 1 wherein outer corners of said latch surfaces are rounded tending to facilitate passing of said retention section through said knockout opening and minimizing the possibility of said retention section snagging said enclosure upon attempted removal of said closure from said opening.

4. The wire management knockout closure of claim 1 wherein said latch surfaces define radially inwardly directed recesses in said retention section, bottom surfaces of the recesses being spaced from each other by a dimension that is just less than the width of said opening in said enclosure.

5. The wire management knockout closure of claim 1 wherein said latch surfaces define radially inwardly directed recesses in said retention section, the axially extending dimension of said recesses being greater than the thickness of said wall of said wire receiving enclosure.

6. The wire management knockout closure of claim 1 wherein notches are defined on inwardly facing surfaces of said beam portions adjacent respective ones of said relief spaces, facilitating inward deflection of said beam portions during insertion of said closure into, and removal of said closure from, said opening.

7. A wire management knockout closure associated with a knockout opening in a wall of a wire receiving enclosure, said closure comprising:

a body section adapted to traverse said opening;

a grippable portion at an inwardly facing end of said body section when said closure is disposed in said opening; and a wire holding portion at an outwardly facing end of said body section when said closure is disposed in said opening;

said closure further including a retention section, which in cooperation with said opening removably retains said closure in said opening;

one of said retention section and said body section being adapted to prevent said closure from passing through said opening, whereby when said closure is in position, said wire holding portion is at least exposed exteriorly of said enclosure and is secured to portions of wires, and when said closure is pulled inwardly from said opening, said portions of wires are pulled into said enclosure for performance of worksteps thereon, and wherein;

said wire holding portion includes one or more transverse openings therethrough permitting insertion of said portions of wires therethrough.

8. A wire management knockout closure associated with a knockout opening in a wall of a wire receiving enclosure, said closure comprising:

a body section adapted to traverse said opening;

a grippable portion at an inwardly facing end of said body section when said closure is disposed in said opening; and a wire holding portion at an outwardly facing end of said body section when said closure is disposed in said opening;

said closure further including a retention section, which in cooperation with said opening removably retains said closure in said opening: and one of said retention section and said body section being adapted to prevent said closure from passing through said opening, whereby when said closure is in position, said wire holding portion is at least exposed exteriorly of said enclosure and is secured to portions of wires, and when said closure is pulled inwardly from said opening, said portions of wires are pulled into said enclosure for performance of worksteps thereon, and wherein;

the wire holding portion comprises a first opening in a wall extending rearwardly from the body section through which a continuous loop of wire can be laced to attach the loop of wire to the wire management knockout closure without cutting the loop of wire.

9. The wire management knockout closure of claim 8, having additional openings provided in the wall in which the first opening is formed, each of said additional openings having an inside diameter substantially the same as an outer diameter of a wire to be attached, said additional openings being provided so that free ends of wires can be inserted in said additional openings to secure the wires.

10. The wire management knockout closure of claim 9 wherein opposed beams and a transverse bight define the first opening, the beams resiliently bending into the first opening during insertion of the closure into the knockout.

11. The wire management knockout closure of claim 8 wherein a second wall extends transversely of the wall containing the first opening.

12. The wire management knockout closure of claim 11 wherein the width of the second wall is substantially equal to the diameter of said opening in which the closure is to be inserted, the two walls serving to position the knockout closure in said opening.

13. The wire management knockout closure of claim 12 wherein the closure comprises a one-piece molded member, with only one of the walls having openings therein so that the closure can be molded without the use of side pulls in a mold.

* * * * *